(12) United States Patent
Liu

(10) Patent No.: US 8,423,192 B2
(45) Date of Patent: Apr. 16, 2013

(54) FRESH AIR CONTROL DEVICE AND ALGORITHM FOR AIR HANDLING UNITS AND TERMINAL BOXES

(76) Inventor: Mingsheng Liu, Omaha, NE (US)

(*) Notice: Subject to any disclaimer, the term of this patent is extended or adjusted under 35 U.S.C. 154(b) by 266 days.

(21) Appl. No.: 12/800,114

(22) Filed: May 10, 2010

(65) Prior Publication Data

US 2011/0276183 A1 Nov. 10, 2011

(51) Int. Cl.
*G01F 17/00* (2006.01)
*F24F 11/02* (2006.01)

(52) U.S. Cl.
USPC .................. 700/276; 236/49.3; 454/229

(58) Field of Classification Search .......... 700/276–278; 454/228, 229, 236, 239; 236/46 R, 49.3
See application file for complete search history.

(56) References Cited

U.S. PATENT DOCUMENTS

| | | | |
|---|---|---|---|
| 6,919,809 B2* | 7/2005 | Blunn et al. | 340/632 |
| 7,475,828 B2* | 1/2009 | Bartlett et al. | 236/49.3 |
| 8,147,302 B2* | 4/2012 | Desrochers et al. | 454/228 |
| 2006/0234621 A1* | 10/2006 | Desrochers et al. | 454/239 |
| 2009/0143915 A1* | 6/2009 | Dougan et al. | 700/276 |
| 2010/0070088 A1* | 3/2010 | Josserand et al. | 700/277 |

* cited by examiner

*Primary Examiner* — Dave Robertson

(57) ABSTRACT

A method of controlling an existing heating, ventilation, and air conditioning system that is configured to condition at least one zone and includes at least one terminal box having a terminal box interface and plurality of control components. The method comprises integrating a control device into said system such that the control device is in communication with the terminal box, terminal box interface, and control components of said system. The control device collects a plurality of zone characteristics, airflow measurements, and occupancy variables, calculates for a primary air freshness based on the plurality of airflow measurements, an outside air requirement based on some of the plurality of zone characteristics and occupancy variables, and a minimum airflow set point by dividing the calculated outside air requirement by the primary air freshness. The control components of said system are modulated based on the calculated minimum airflow set point.

4 Claims, 3 Drawing Sheets

Additional Terminal Boxes

FRESH AIR CONTROL DEVICE AND ALGORITHM FOR AIR HANDLING UNITS AND TERMINAL BOXES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Technical Field

Embodiments are generally related to air handling unit ("AHU") and terminal boxes and particularly to air handling unit and terminal boxes used in commercial and office buildings, university and school buildings, hospital buildings, hotels, and industrial production and research facilities.

2. Discussion of Prior Art

AHU and terminal boxes are widely utilized in a variety of commercial and industrial buildings to condition and circulate air in occupied spaces and ensure occupant comfort. Typical applications of AHUs include but are not limited to single duct variable air volume air handling units, dual duct variable air volume air handling units, and multi-zone air handling units.

Terminal boxes are typically comprised of a single damper (single duct) or a plurality of dampers (dual duct), heating coil or plurality of strip electrical heaters, an airflow station, a discharge air temperature sensor, and a controller. The controller may receive information from a thermostat, an occupancy sensor, and a carbon dioxide sensor.

When a building is designed and built, an important factor that engineers must take into account is the fresh air requirement. Structures occupied by animals and humans require a specific quantity of fresh air to be habitable. Fresh air also dilutes the volatile organic compounds ("VOCs") that may exist in any given room. ASHRAE Standard 62.2 provides a general guideline to ensure that a building meets this fresh air requirement. According to the Standard, a minimum airflow rate should be set up for each terminal box. Under design load conditions the fresh air intake is generally 10% to 20% from the air handling unit, with the minimum airflow rate often as high as 40% of the terminal box design airflow rate. Regardless of the specific building load, a constant minimum airflow rate is maintained. When the zone load served by the terminal box is lower than the minimum airflow ratio, the room temperature is maintained by reheat. Not only does keeping the airflow at a minimum constant rate fail to satisfy the fresh air requirement, but doing so results in the consumption of a significant amount of heating, cooling, and fan power energy.

The prior art includes several methods that maintain the required fresh air intake rates. In the demand based on fresh air control method, for example, a carbon dioxide sensor is installed on the return air duct to measure the concentration of carbon dioxide in the actual return air. The concentration of carbon dioxide is controlled at a rate of 700 PPM (adjustable, it is recommended by ASHRAE) higher than the concentration of carbon dioxide in the outside air. The outside air damper closes when the concentration of carbon dioxide is less than 700 PPM higher than the concentration of carbon dioxide in the outside air, and it opens more when the carbon dioxide concentration is greater than that same rate. The problem with this method, however, is twofold. First, because the occupancy rate and fresh air requirements for each zone differ, the fresh air requirement is not necessarily met in every zone. Second, the method cannot be applied in situations in which the building is lightly occupied and fresh air is predominantly used for the purpose of diluting volatile organic compounds.

A popular method in the prior art to solve the problems associated with demand based fresh air control is to set the target concentration of carbon dioxide in the return air at a lower level, for example, at 400 PPM higher than the concentration of carbon dioxide in the outside air. While this method improves the circulation of fresh air to each zone, it cannot ensure that the ventilation and fresh air requirements are satisfactorily met. Moreover, the method substantially increases the outside air intake (by as much as 40% for the entire building) as well as heating and cooling energy consumption rates. The minimum air intake ratio remains the same or is as high as 40% of the design airflow rate.

The prior art also proposes installing carbon dioxide sensors in each room to ensure that fresh air is properly distributed. This approach increases operating costs, as it requires the implementation of a significant number of carbon dioxide sensors that must be calibrated every six months. Oftentimes, these sensors give inaccurate carbon dioxide readings or are unreliable in that the expected results are not achieved. While fresh air is effectively distributed when a room is normally occupied, available fresh airflow may be reduced to zero when the room is unoccupied. In fact, during the time that the room is unoccupied, volatile organic compounds can build up and compromise the overall quality of the indoor air. Moreover, since the terminal box continues to operate at a minimum rate, excessive heating, cooling, and fan power usage may also result.

Attempting to solve the problems presented by the prior art, engineers developed a dedicated outside air intake unit that provides a constant amount of outside air to the building based on the design conditions. However, this new technology is not suitable for use under all occupancy conditions. The number of people that occupy a specific area within a building is dependent on factors that include the time of day, the day of the week, and even the particular season of the year. Therefore, due to fluctuating zone occupancy levels, the dedicated outside air intake unit often provides an excess of outside air to the building as a whole or an inadequate amount to specific, more heavily occupied zones. Further, like in the prior art, the terminal box still has a minimum airflow rate that results in excessive heating, cooling, and fan power usage.

In summary, although improvements have been made to fresh air technologies over the years, inadequate control of fresh air in a building continues to be a problem. Currently implemented methods fail to ensure that a proper amount of fresh air is distributed to each thermally controlled zone. Moreover, excessive heating, cooling, and fan power consumption results when the terminal box uses a constant minimum air flow rate. The energy wasted is often as high as 30% of the total HVAC energy consumption rate.

SUMMARY OF THE INVENTION

The following summary of the invention is provided to facilitate an understanding of some of the innovative features unique to an embodiment of the present invention and is not intended to be a full description. A full appreciation of the various aspects of the invention can be gained by taking the entire specification, claims, drawings, and abstract as a whole.

Accordingly, it is an object of an embodiment of the proposed system and method to improve upon the prior art so that indoor air quality requirements are met and that reheat, cooling, and fan power consumption rates are reduced by as much as 30% that of previous rates.

In an embodiment, a method of controlling an existing heating, ventilation, and air conditioning system is provided. The existing heating, ventilation, and air condition system is configured to condition at least one zone and includes at least one terminal box having a terminal box interface and a plurality of control components. The method includes integrating a control device into the existing heating, ventilation, and air conditioning system such that the control device is in communication with the terminal box and terminal box interface, as well as with the control components of the existing heating, ventilation, and air conditioning system. The control device collects a plurality of zone characteristics, a plurality of airflow measurements, and a plurality of occupancy variables. In the method, the control device calculates for a primary air freshness based on measurements of the concentration of carbon dioxide or volatile organic compound in outside, return, and primary airflows, and determines an outside air requirement using some of the plurality of zone characteristics and occupancy variables. The control device then calculates for a minimum airflow set point by dividing the outside air requirement by the primary air freshness. The control components of said existing heating, ventilation, and air-conditioning system are modulated-based on the calculated minimum airflow set point.

Other aspects will become apparent by consideration of the detailed description and accompanying drawings.

DRAWINGS REFERENCE NUMERALS

100 Fresh Air Controller
101 Building Controller
102, 104, 106, 108, 110, 112, 114, 116, 118, 120, 122, 124 Terminal Box Controllers
103, 105, 107, 109, 111, 113, 115, 117, 119, 121, 123, 125 Terminal Boxes
126, 128, 130 Sensors

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," and variations thereof herein is meant to encompass the items listed thereafter and equivalents thereof as well as additional items. Unless specified or limited otherwise, the terms "attached," "connected," "supported," and variations thereof are used broadly and encompass both direct and indirect mountings, connections, and supports. Further, "connected" is not restricted to physical or mechanical connections.

Figure 1:
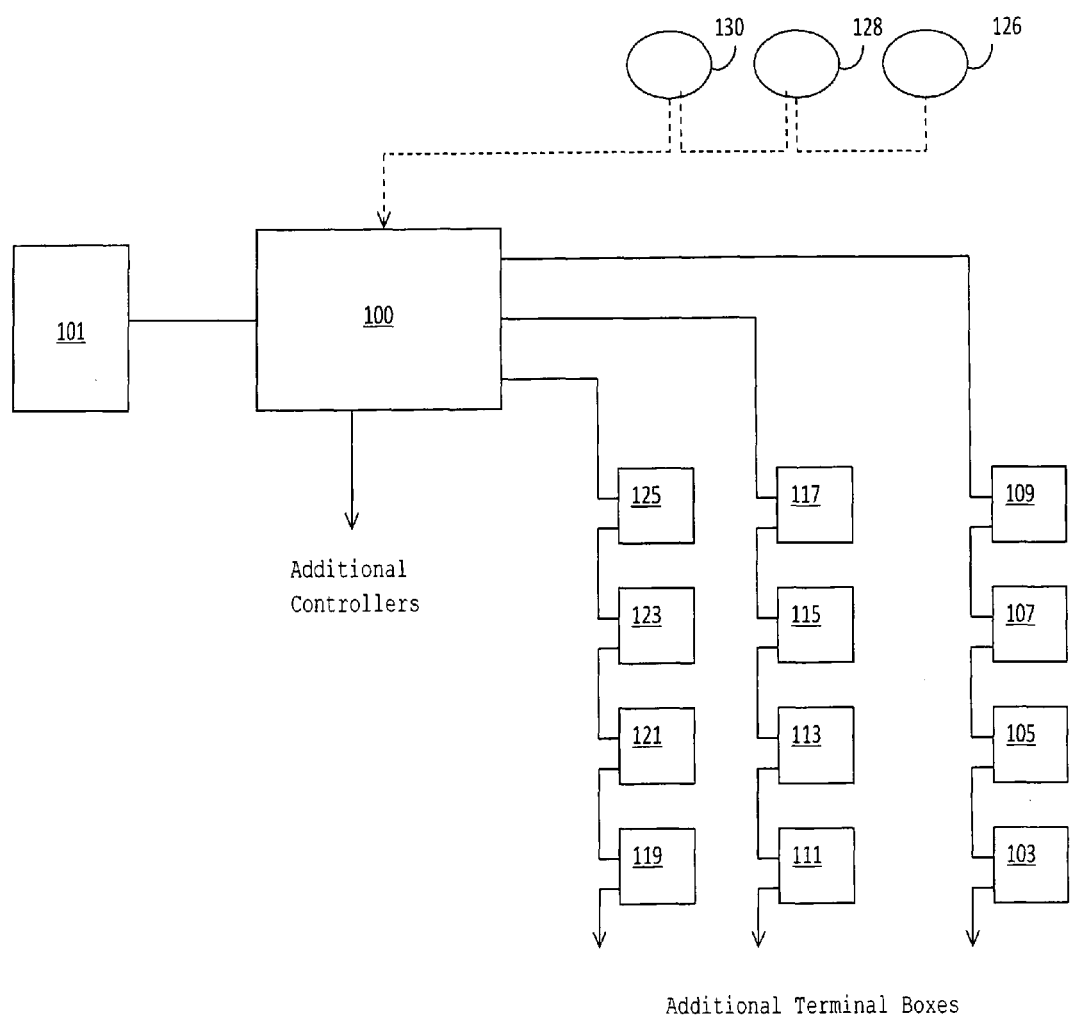
FIG. 1 illustrates a fresh air control system according to an embodiment of the invention.
Figure 2:
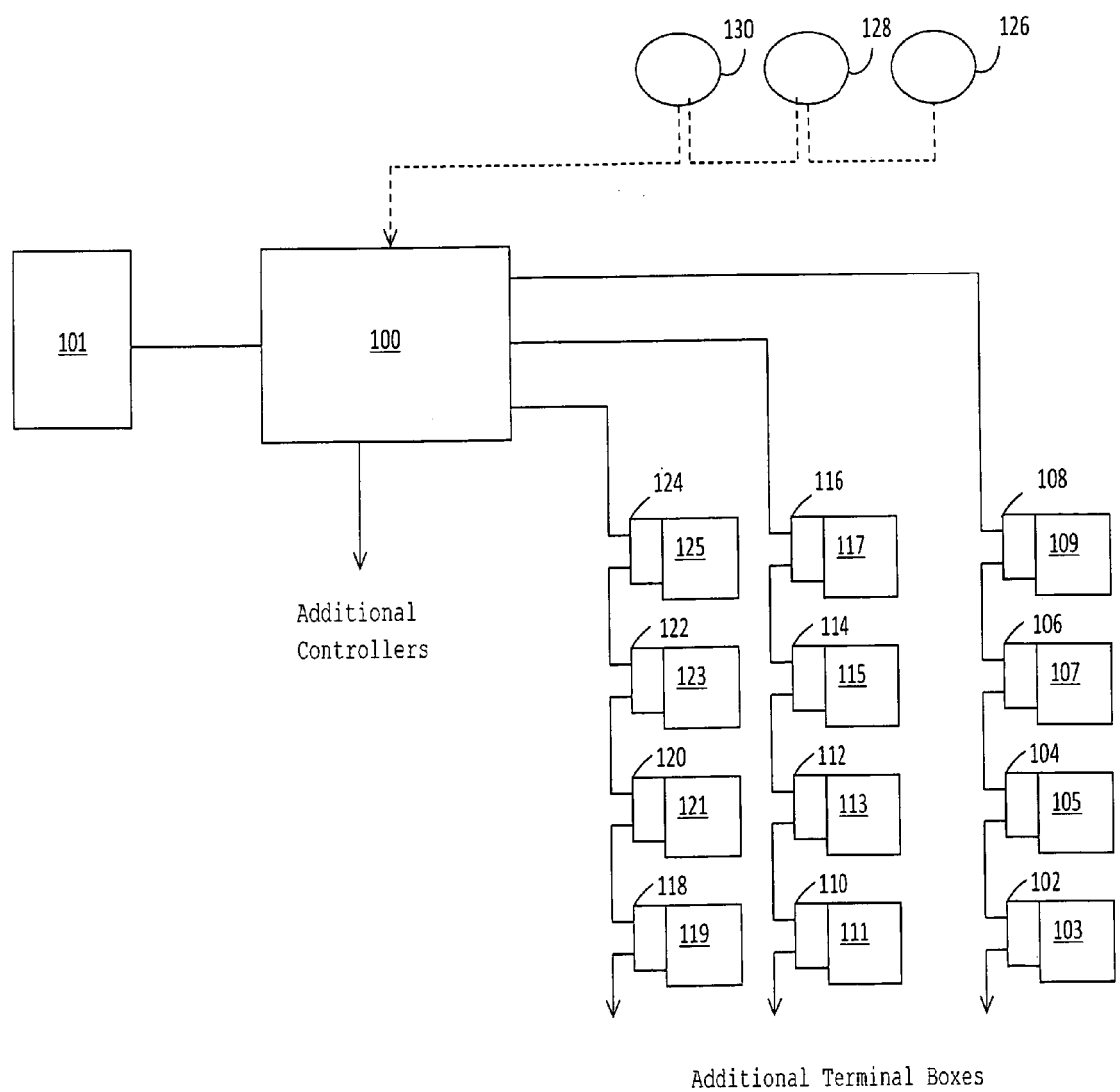
FIG. 2 illustrates a fresh air control system according to another embodiment of the invention.
Figure 3:
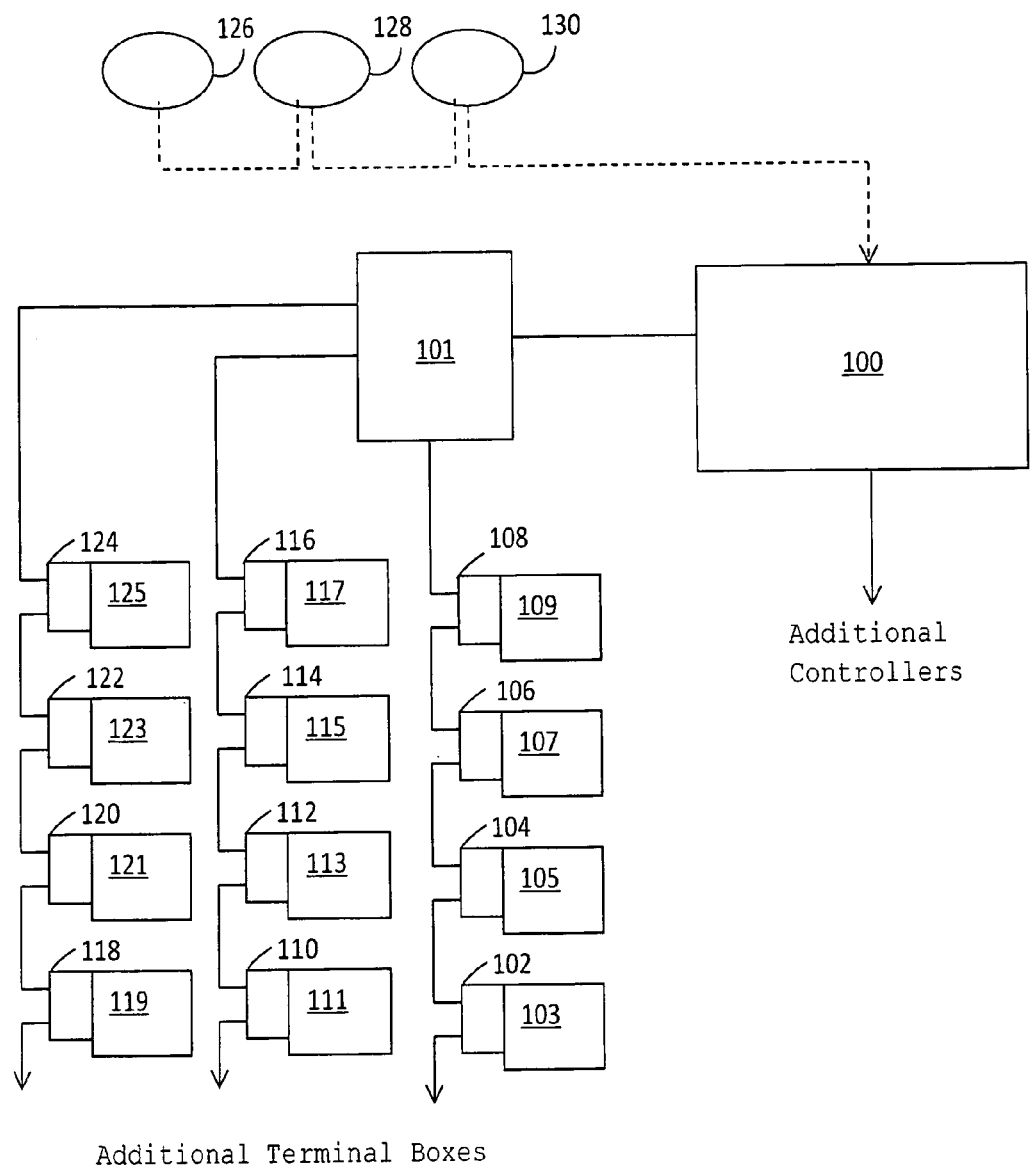
FIG. 3 illustrates a fresh air control system according to yet another embodiment of the invention.

FIGS. 1-3 illustrate fresh air controller 100 according to several embodiments of the invention. Fresh air controller 100 may be implemented in buildings in connection with the buildings existing HVAC (heating, ventilation, and air-conditioning) control system. Once incorporated, fresh air control system 100 determines the minimum airflow set points to send to terminal boxes 103, 105, 107, 109; 111, 113, 115, 117, 119, 121, 123, and 125. The terminal boxes are not limited to the specific configuration or quantity illustrated in the Figs. The differing ways that the implemented fresh air control system 100 can communicate with the controllers and terminal boxes of the existing HVAC (heating, ventilation, and air-conditioning) system are discussed in more detail below.

In the embodiments illustrated in FIGS. 1-3, sensors 126, 128, and 130 are provided in signal communication with fresh air controller 100. Sensors 126, 128, and 130 may be carbon dioxide sensors or volatile organic compound sensors. Notably, sensor types cannot be intermixed. If carbon dioxide sensors are chosen as the sensor type, for example, all sensors used must be carbon-dioxide sensors. Measurements of the concentration of carbon dioxide or volatile organic compounds in the outside air, return air, and primary air are collected by the carbon dioxide and volatile organic compound sensors, respectively. Measurements collected by sensors 126, 128, and 130 can be communicated to fresh air controller 100 through analog, digital, a mix of analog and digital signals, or by wireless means. The sensors are not limited to the configuration shown in the embodiment in FIG. 1.

As an alternative to using sensors 126, 128, and 130, additional controllers (one or a plurality of controllers) mentioned but not illustrated in FIG. 1 can be coupled to fresh air controller 100. The additional controller or controllers directly relay measurements of the concentration of carbon dioxide and volatile organic compounds in the outside and primary airstreams as well as in the return air to fresh air controller 100.

As an alternative to using sensors or additional controllers, building controller 101 can also be configured to send the carbon dioxide and volatile organic compound measurements directly to fresh air controller 100. Building controller 101 may be an existing system controller in the building where fresh air controller 100 has been implemented. Building controller 101 can be connected in communication with fresh air controller 100 and configured to send fresh air controller 100 all or only some of the carbon dioxide or volatile organic compound measurements it needs to control the terminal boxes. In another embodiment, building controller 101 sends all the previously mentioned measurements to fresh air controller 100 and thus eliminates the need for sensors 126, 128, and 130 or the additional controllers altogether.

Fresh air controller 100 may receive zone occupancy information directly from terminal box controllers 102, 104, 106, 108, 110, 112, 114, 116, 118, 120, 122, 124 or from occupancy schedules pre-set in building controller 101. Dedicated zone occupancy sensors (not illustrated in the Figs.) may directly interface with fresh air controller 100. Fresh air controller 100 receives data on the specific zone characteristics from the system operator and the terminal box controller interfaces. Zone characteristics include information on the intended usage of a specific zone as well as its dimensions, age, and occupancy rate.

Once it receives data on the concentration of the carbon dioxide or volatile organic compounds, the occupancy data, and zone characteristics, fresh air controller 100 determines a minimum airflow set point to send to each terminal box. The necessary calculations are described in detail in the following.

Fresh air controller 100 calculates for the primary air freshness ($\beta$) based on the collected measurements according to the following equation:

$$\beta = 1 - \frac{CO2 \text{ or } VOC_{Primary} - CO2 \text{ or } VOC_{outside\ air}}{\Delta CO2 \text{ or } \Delta VOC} \quad (1)$$

The $\Delta CO2$ or $\Delta VOC$ represents an increase in the concentration of the desired carbon dioxide or volatile organic compounds in a typical occupied zone or building. ASHRAE guidelines recommend a concentration of 700 PPM for carbon dioxide.

Fresh air controller 100 also calculates for a fresh air requirement for each zone. When a zone is occupied, the fresh air requirement is calculated according to ASHRAE Standard 62.1.

$$CFM_{freshair} = R_p \cdot P_z + R_a \cdot A_Z \quad (2)$$

Where, $CFM_{fresh\ air}$—air volumetric flow rate for fresh air requirement, ft$^3$/min $R_p$—outdoor airflow rate required per person as determined from Table 6-1 ASHRAE Standard 62, 2004 (5 CFM/person for office)

$P_z$—zone population, person $R_a$—outdoor airflow rate required per unit area as determined from Table 6-1 ASHRAE Standard 62, 2004 (0.06 CFM/ft$^2$)

$A_Z$—zone floor area, ft$^2$

Fresh air controller 100 determines a minimum airflow set point based on the calculations in equations 1 and 2. Thus, a minimum airflow set point ($CFM_{minimum\ airflow1}$) is determined by finding the ratio of the outside air requirement ($CFM_{freshair}$) over the primary air freshness ($\beta$) as shown by equation 3:

$$CFM_{minimum\ airflow1} = \frac{CFM_{bfresh\ air}}{\beta} \quad (3)$$

This minimum airflow set point calculation is required for all three of the terminal box control options illustrated in FIGS. 1-3. Specific differences between the methods and embodiments displayed in the Figs. will become evident in the following description.

In a first method based on the embodiment illustrated in FIG. 1, terminal boxes 103, 105, 107, 109, 111, 113, 115, 117, 119, 121, 123, and 125 send the occupancy data to fresh air controller 100. The fresh air controller communicates with each terminal box through an input/output (I/O) interface. The interface receives information on the room temperature, terminal box airflow, and the room temperature set point and then converts that data into a digital signal. This signal is then sent to fresh air controller 100 either digitally through a wire or wirelessly.

Based on the data it receives following equation 3, fresh air controller 100 determines a minimum airflow set point ($CFM_{minimum\ airflow1}$) and uses that set point to deliver commands for controlling the system damper positions, valve positions, fan status, and electrical heater status. The fresh air controller relays the commands to each input/output (I/O) interface by a digital signal transmitted through wire or by a wireless signal.

The input/output (I/O) strip in turn converts the commands into an analog signal and sends them to the system actuators (not illustrated in FIG. 1). If a signal convertor is built into the system actuators of the existing system, then the actuators can be commanded by fresh air controller 100 directly.

In a second method based on the embodiment illustrated in FIG. 2, terminal boxes 103, 105, 107, 109, 111, 113, 115, 117, 119, 121, 123, and 125 are each connected to terminal box controllers 102, 104, 106, 108, 110, 112, 114, 116, 118, 120, 122, and 124, respectively. The terminal box controllers and fresh air controller 100 communicate with each other through digital means. The terminal box controllers send the occupancy data to fresh air controller 100 and in turn receive the calculated minimum airflow set point $CFM_{minimum\ airflow1}$.

The terminal box controllers control their assigned terminal boxes by generating appropriate commands to the system damper, valve, fan, and electrical heaters based on the minimum airflow set point ($CFM_{minimum\ airflow1}$) calculated by fresh air controller 100 and the occupancy data (zone temperature, room temperature set point, and actual airflow measurements). The terminal boxes and controllers are not limited to the configuration or quantity as that shown in FIG. 2.

In a third method based on the embodiment illustrated in FIG. 3, the calculated minimum airflow set point ($CFM_{minimum\ airflow1}$) is sent directly from building controller 101 to terminal box controllers 102, 104, 106, 108, 110, 112, 114, 116, 118, 120, 122, and 124. The terminal box controllers modulate the system dampers and valves (not illustrated in FIG. 3) to ensure that the distribution of air to each assigned zone is above or at the minimum airflow set point ($CFM_{minimum\ airflow1}$). Electric heaters (not illustrated in FIG. 3) are turned on an off by the terminal box to ensure that the room temperature set point is maintained. The terminal boxes and controllers are not limited to the configuration or quantity as that shown in FIG. 3.

Various features and advantages of the invention are set forth in the following claims.

What is claimed is:

1. A method of controlling an existing heating, ventilation, and air conditioning system, said existing heating, ventilation, and air-conditioning system configured to condition at least one zone and having at least one terminal box, and a plurality of control components, said method comprising:

integrating a controller into said existing heating, ventilation, and air conditioning system such that said controller is in communication with said at least one terminal box and said plurality of control components, said controller programmed with a carbon dioxide baseline value for said existing heating, ventilation, and air-conditioning system and a fresh air requirement for said at least one zone;

integrating at least one outside air sensor and at least one primary air sensor into an outside airflow and a primary air flow of said existing heating, ventilation, and air conditioning system, said at least one outside air sensor and at least one primary air sensor connected in signal communication with and configured to measure and send to said controller at least one of a primary air carbon dioxide measurement and at least one of an outside air carbon dioxide measurement in said existing heating, ventilation, and air conditioning system;

calculating, by said controller, a primary air freshness for said at least one zone comprising finding one minus a ratio of the difference between said primary air carbon dioxide measurement and said outside air carbon dioxide measurement over a difference between said carbon dioxide baseline value and said outside air carbon dioxide measurement;

generating, by said controller, a minimum airflow set point for said at least one zone comprising finding a ratio of said fresh air requirement over said primary air freshness;

controlling said existing heating, ventilation, and air conditioning system comprising modulating said plurality of control components based on said minimum airflow set point.

2. The method of claim 1, wherein generating, by said controller, a minimum airflow set point of said at least one zone further comprises integrating a controller into said existing heating, ventilation, and air-conditioning system such that said controller is in communication with said at least one terminal box and said plurality of control components, said controller programmed with said fresh air requirement for said at least one zone and a desired volatile organic compound baseline value for said at least one zone, integrating at least one primary air volatile organic compound sensor and at least one outside air volatile organic compound sensor into said existing heating, ventilation, and air conditioning system, said at least one primary air volatile organic compound sensor and said at least one outside air volatile organic compound sensor connected in signal communication with and configured to measure and send to said controller at least one of a primary air volatile organic compound measurement and at least one of an outside air volatile organic compound measurement in said existing heating, ventilation, and air-conditioning system;

finding a ratio of one minus a difference between said primary air volatile organic compound measurement and said outside air volatile organic compound measurement over a difference between said desired volatile organic compound baseline value and said outside air volatile organic compound measurement;

calculating, by said controller, a volatile organic compound primary air freshness for said at least one zone further comprising finding one minus a ratio of the difference between said primary air volatile organic compound measurement and said outside air volatile organic compound measurement over the difference between said desired volatile organic compound threshold value and said outside air volatile organic compound measurement;

finding a ratio of said fresh air requirement over said primary air freshness.

3. The method of claim 1, wherein said fresh air requirement for said at least one zone is based on ASHRAE Standard 62.1.

4. The method of claim 1, wherein said carbon dioxide baseline value for said existing heating, ventilation, and air-conditioning system is 700 ppm based on ASHRAE Standard 62 2001.

* * * * *